(12) United States Patent
Maeda et al.

(10) Patent No.: US 8,104,404 B2
(45) Date of Patent: Jan. 31, 2012

(54) IGNITION ELEMENT MOUNTING CAPACITOR, HEADER ASSEMBLY, SQUIB AND GAS GENERATOR FOR AIR BAG AND GAS GENERATOR FOR SEAT BELT PRETENSIONER

(75) Inventors: Shigeru Maeda, Himeji (JP); Atsushi Ishida, Nagaokakyo (JP); Katsuki Nakanishi, Nagaokakyo (JP); Yoshihiro Koshido, Nagaokakyo (JP); Hajime Yamada, Nagaokakyo (JP); Naoko Aizawa, Nagaokakyo (JP); Yasuaki Matsumura, Tokyo (JP); Toshiaki Furuya, Tokyo (JP)

(73) Assignee: Nipponkayaku Kabushikikaisha, Tokyo (JP)

( * ) Notice: Subject to any disclaimer, the term of this patent is extended or adjusted under 35 U.S.C. 154(b) by 138 days.

(21) Appl. No.: 12/516,927

(22) PCT Filed: Nov. 30, 2007

(86) PCT No.: PCT/JP2007/073235
§ 371 (c)(1),
(2), (4) Date: Sep. 14, 2009

(87) PCT Pub. No.: WO2008/066175
PCT Pub. Date: Jun. 5, 2008

(65) Prior Publication Data
US 2010/0072736 A1    Mar. 25, 2010

(30) Foreign Application Priority Data
Dec. 1, 2006 (JP) ................................. 2006/326330

(51) Int. Cl.
*F42B 3/13* (2006.01)
(52) U.S. Cl. ............. 102/202.7; 102/202.5; 102/202.14; 102/206

(58) Field of Classification Search .................. 102/200, 102/202.1, 202.2, 202.5, 202.7, 206, 218; 361/251
See application file for complete search history.

(56) References Cited

U.S. PATENT DOCUMENTS
6,166,452 A    12/2000   Adams et al.
(Continued)

FOREIGN PATENT DOCUMENTS
JP    2000108838    4/2000
(Continued)

OTHER PUBLICATIONS
PCT/JP2007/073235 International Search Report.

*Primary Examiner* — James Bergin
(74) *Attorney, Agent, or Firm* — Allston L. Jones; David J. Aston; Peters Verny, LLP

(57) ABSTRACT

An ignition element mounting capacitor having an ignition element mounted on a capacitor, includes therein a first capacitor section and a second capacitor section, and first external terminal electrodes electrically connected to the first capacitor section and second external terminal electrodes electrically connected to the second capacitor section. The first capacitor section has a capacity for igniting ignition powder, and the second capacitor section has a function for removing noise which affects external circuits. Further, provided on the surface of the capacitor are third external terminal electrodes electrically connected to the ignition element. In this manner, the invention provides a squib enabling its size to be miniaturized and its quality to be improved, while keeping a high productivity, and hence provides a header assembly and a ignition element mounting capacitor as components of the squib and further provides a gas generator having such a squib installed therein for an air bag and a gas generator having the squib for a seat belt pretensioner.

14 Claims, 12 Drawing Sheets

U.S. PATENT DOCUMENTS 6,199,484 B1 * 3/2001 Martinez-Tovar et al. ... 102/202.4

FOREIGN PATENT DOCUMENTS

| | | |
|---|---|---|
| JP | 2003205823 A | 7/2003 |
| JP | 2003252168 A | 9/2003 |
| JP | 2005121281 A | 5/2005 |
| JP | 2005201628 A | 7/2005 |
| JP | 3115619 U | 9/2005 |
| JP | 3118047 U | 12/2005 |
| JP | 3118048 U | 12/2005 |

* cited by examiner (a)

(b)

(a)

(b)

_US 8,104,404 B2_

IGNITION ELEMENT MOUNTING CAPACITOR, HEADER ASSEMBLY, SQUIB AND GAS GENERATOR FOR AIR BAG AND GAS GENERATOR FOR SEAT BELT PRETENSIONER

CROSS-REFERENCE TO RELATED APPLICATIONS

This application claims priority from PCT application PCT/JP2007/073235, filed on Nov. 30, 2007, which is hereby incorporated by reference in its entirety, and this application further claims priority to Japanese Patent Application No. 2006-326330 filed on Dec. 1, 2006.

TECHNICAL FIELD

This invention relates to a squib to be installed in a gas generator or the like used in a safety device for a car such as an air bag and the like.

Moreover, this invention relates to a header assembly which is a component of the squib described above, and an ignition element mounting capacitor to be built in the header assembly.

Further, this invention relates to a gas generator with such a squib installed therein for an air bag, and a gas generator with the squib for a seat belt pretensioner.

BACKGROUND ART

A various kinds of electric squibs have been developed as squibs for gas generators for inflating air bags equipped in cars.

Such a squib usually has metal pins for electrically connecting to the external, and a heating element at the other ends of the metal pins for igniting an explosive.

With hitherto used ignition devices, bridging wires have been used for igniting ignition powder. Nichrome wires have been used as bridging wires. If wire diameters are too fine, the bridging wires could not be attached. When using bridging wires of diameters enabling the wires to be attached, however, the wires of such diameters generally have large heat capacities so that sufficient electrical charges must be stored in capacitors having great capacities for the purpose of igniting ignition powder only by energy of communication as is the case with a BUS system.

As another ignition device, moreover, a method has been known for forming a thick film resistor directly on a printed circuit board using the technique for producing the printed circuit board.

For example, Patent Document 1 has disclosed a squib using a printed circuit board on which a thick film resistor is directly formed, and a varistor is mounted on another part on the printed circuit board for the purpose of electrostatic protection.

Further, Patent Document 2 has disclosed a squib obtained by production steps of mounting a resistive heating element on a printed circuit board likewise, connecting a capacitor and a varistor to the printed circuit board by soldering, and further connecting the product thus obtained to electrode pins.

Although, these ignition devices have been improved to reduce the energy required for ignition in comparison with the case using the bridging wires, the reduction in required energy has remained insufficient.

Patent Document 1: Official Gazette of Japanese Patent Application Laid Open No. 2003-205.823

Patent Document 2: Official Gazette of Japanese Patent Application Laid Open No. 2000-108,838

On the other hand, the semiconductor bridge (SCB) is a generic designation of bridges produced using the semiconductor technique such as a sputtering, vapor deposition, and the like. Ignition devices using semiconductor bridges are of a very fine structure having narrow widths of lines as compared with those using bridging wires or printed circuit boards. Further, the ignition devices using semiconductor bridges utilize thin film bridges whose film thicknesses are of the order of a few microns so that it is possible to make their heat capacity smaller so as to have quick responsibility and ignition ability with low energy. The bridge wires require time period of 800 to 1,000 microseconds for heating ignition powder to its ignition temperature with electric current of 1.2 A so that the energy required for ignition is of the order of 2.9 mJ. In contract therewith, the semiconductor bridges enable ignition powder to be ignited by energy less than 0.44 mJ using discharge from a capacitor having a small capacity. With the SCB, since semiconductor production equipment such as for sputtering and vapor deposition may be used, it is possible not only to make the board remarkably smaller but also to make the heat capacity of heating part smaller and to accurately control the heat capacity, thereby stably producing squibs which are higher in ignition responsibility and enable ignition with low energy.

When using such semiconductor bridges having smaller heat capacities, however, there is a risk of erroneous ignition of the squib due to noise such as external static electricity.

Therefore, known in the art is arranging a capacitor in parallel with the semiconductor bridges for absorbing discharged static electricity in order to prevent the erroneous ignition due to the static electricity as disclosed in Patent Document 3.

Moreover, a squib having an IC built therein has been disclosed in Patent Document 4 in order to make it possible to perform an ignition by means of communication called BUS system.

With this ignition device, a second small semiconductor plate including integrated circuits is located on a header, and further sequentially stuck thereon are a first small semiconductor plate including a capacitor having stored energy for igniting an ignition element and a third small semiconductor plate including the ignition element.

Moreover, in order to remove noise such as external static electricity, a filter capacitor is attached between electrode pins outside the header.

Patent Document 3: Specification of U.S. Pat. No. 4,944,224

Patent Document 4: Official Gazette of PCT Japanese Phase Publication No. 2000-513,799

DISCLOSURE OF THE INVENTION

Task to be Solved by the Invention

With the ignition device disclosed in the Patent Document 4 described above, although the miniaturization of the squib can be advantageously achieved, the following problems still remain.

The first problem is the fact that the second small semiconductor plate (ignition element) and the third small semiconductor plate (IC) are connected by bonding wires. In more detail, in recent years, it has been carried out to push a header assembly into the opening of a cup body having ignition powder therein and to fix the header assembly to the cup body laser welding in order to achieve more intimate contact of the ignition element with the ignition powder to improve the ignition responsibility. Upon applying such a great pushing force, there would be a high possibility of breaking of the bonding wires connected to the ignition element.

The second problem is the fact that a semiconductor capacitor is used as an energy-storing capacitor for ignition. As the electrical energy that this capacitor can store is small, it is needed to use an SCB having a high ignition sensibility. In this case, however, the ignition sensibility is so high that the risk of erroneous explosion caused by noise would be increased.

Further, the third problem is that the filter capacitor for removing the noise is located between the electrode pins outside the header as described above. Therefore, the distance between the filter capacitor and the IC chip is comparatively elongated so that a sufficient noise removal performance can not be obtained.

With the stuck structure of the first to third small semiconductor plates as disclosed in the Patent Document 3, since the surface of the header board becomes uneven, it would be anxious that irregularities in density of explosive would occur when assembling the header and the cup body having ignition powder therein.

The invention is able to advantageously solve the problems described above, and the invention has an object to provide a squib enabling a size to be minimal and a quality to be improved while maintaining high productivity, together with a header assembly as one component of the squib, an ignition element mounting capacitor to be built in the header assembly, and further a gas generator with the squib installed therein for an air bag, and a gas generator having the squib installed therein for a seat belt pretensioner.

Solution for the Task

By the way, the inventors of the present case have earnestly investigated to solve the problems described above and have obtained the following recognitions.

(1) In the past, in the case that a capacitor for ignition and a bypass capacitor for stabilizing the internal electric power source for an IC are built in a header assembly, these capacitors are separately located in the header assembly. If only one capacitor is capable of serving as these two kinds of capacitors, the number of installed parts can be reduced and a miniaturization of the squib can be achieved.

(2) Moreover, if a squib is so constructed that an ignition element is mounted on one capacitor having the functions of the two kinds of capacitors described above, the squib can be even more miniaturized.

(3) Further, noise reducing effect can be obtained in an ideal condition by locating a bypass capacitor immediately on the IC.

(4) Furthermore, an ignition capacitor is located immediately on an IC, and an ignition element is located immediately on the ignition capacitor so that the ignition element and the IC are connected through external terminal electrodes provided on the capacitor, with the result that the ignition element on the uppermost surface and the IC on the lowermost surface can be electrically connected without using wire bonding. Since there is no wire bonding at the contact surface with the ignition powder, a high ignition reliability can be obtained.

(5) By using a ceramic capacitor as the capacitor, it becomes possible to obtain an arrangement of the electrodes within a size enabling installation directly on the IC, and at the same time both the miniaturization and ignition reliability can be simultaneously accomplished. Further, as the energy that can be stored is great, even an SCB having a low ignition sensibility can be used, and a risk of erroneous ignition due to noise can be reduced.

The invention is based on the recognitions described above.

Namely, the essential features of the invention are as follows.

(1) An ignition element mounting capacitor having an ignition element mounted on a capacitor, characterized in comprising therein a first capacitor section and a second capacitor section, and further first external terminal electrodes electrically connected to said first capacitor section and second external terminal electrodes electrically connected to said second capacitor section, said first capacitor section having a capacity for igniting ignition powder and said second capacitor section having a function for removing noise which affects external circuits, and further comprising, on the capacitor surface, third external terminal electrodes electrically connected to said ignition element.

(2) In the (1) described above, the ignition element mounting capacitor characterized in that said third external terminal electrodes are formed to be connected to a mounted surface of said capacitor.

(3) In the (1) or (2) described above, the ignition element mounting capacitor characterized in that said ignition element is mounted on the surface of said capacitor opposite from said mounted surface.

(4) In any one of (1) to (3) described above, the ignition element mounting capacitor characterized in that said first and second capacitors are ceramic capacitors, respectively.

(5) In any one of (1) to (4) described above, the ignition element mounting capacitor characterized in that said ignition element is an SCB chip comprising an SCB and its substrate.

(6) In (5) described above, the ignition element mounting capacitor characterized in that said third external terminal electrodes are electrically connected to the SCB through relay conductors provided on the substrate of said SCB chip.

(7) A header assembly having a plurality of electrode pins and closing the opening of a cup body including ignition powder therein, characterized in comprising a header for holding said plurality of electrode pins to be insulated from one another, the ignition element mounting capacitor claimed in any one of claims 1 to 6, and an IC having said first, second, and third electrodes for the capacitor to be electrically connected to first, second, and third external terminal electrodes of said ignition element mounting capacitor and having connection electrodes to be electrically connected to the electrode pins of said header for communication with the external, said IC being, located on said header, and said ignition element mounting capacitor being located on said IC and electrically connected to said electrode pins through said connection electrodes provided on said IC.

(8) In (7) described above, the header assembly characterized in that said header is covered with a resin over all but the element surface of said ignition element, said resin having an outer diameter substantially equal to the outer circumferential diameter of said header and the head of said resin reaching at least a level of the height of said ignition element, thereby making flat the contact surface with the ignition powder.

(9) In (7) described above, the header assembly characterized in that arranged on said header is a cylindrical collar having an outer diameter substantially equal to the outer circumferential diameter of said header and the cylindrical head reaching at least a level of the height of said ignition element, and a resin is filled in a region inside said collar except for the element surface of said ignition element, thereby making flat the contact surface with the ignition powder.

(10) A squib characterized in that the header assembly described in any one (7) to (9) is press-fitted in and fixed to the opening of a cup body having ignition powder therein.

(11) A gas generator for an air bag, having the squib described in (10).

(12) A gas generator for a seat belt pretensioner, having the squib described in (10).

Effects of the Invention

Effects of the invention can be enumerated as follows.
(1) According to the invention only one capacitor performs the functions of two kinds of capacitors, that is, the capacitor for ignition and the bypass capacitor for driving the IC and removing the noise, thereby achieving the miniaturization of the squib.
(2) As the construction is employed that the ignition element is mounted on the capacitor described above, the squib can be more miniaturized.
(3) As the ignition element is connected to the IC through the third external terminal electrodes provided on the capacitor, the ignition element on the uppermost surface and the IC on the lowermost surface can be electrically connected without using the wire bonding, and a high ignition reliability can be obtained because there is no wire bonding at the contact surface with the ignition powder.
(4) By locating the bypass capacitor immediately on the IC, the noise reducing effect can be obtained in an ideal condition.
(5) The capacitor for ignition is located immediately on the IC and the ignition element is located immediately on the capacitor for ignition so that the ignition element is connected to the IC through the third external terminal electrodes, with the result that the flow passage of the electrical current flowing through the ignition element becomes very short when the switching circuit in the IC is switched on. Therefore, inductance components become little to reduce losses so that sharp discharge waveforms from the capacitor can be transmitted to the ignition element without modification of the waveforms, with the result that the ignition reliability is remarkably improved.
(6) The respective parts are laid on the header and the contact surface with the ignition powder is flattened by a resin so that irregularities in density of the ignition powder upon the ignition element being pushed to the ignition powder are eliminated and the compact header assembly can be constructed. Moreover, as the ignition powder is securely insulated from the respective electrodes, erroneous ignition of the ignition means can be prevented.
(7) As the ceramic capacitor is used as the capacitor, the electrodes can be arranged within a size enabling direct mounting on the IC, and at the same time great electrostatic capacitances can be held, thereby enabling a miniaturization and an improvement in ignition reliability.

DESCRIPTION OF THE REFERENCE NUMERALS

Figure 1:
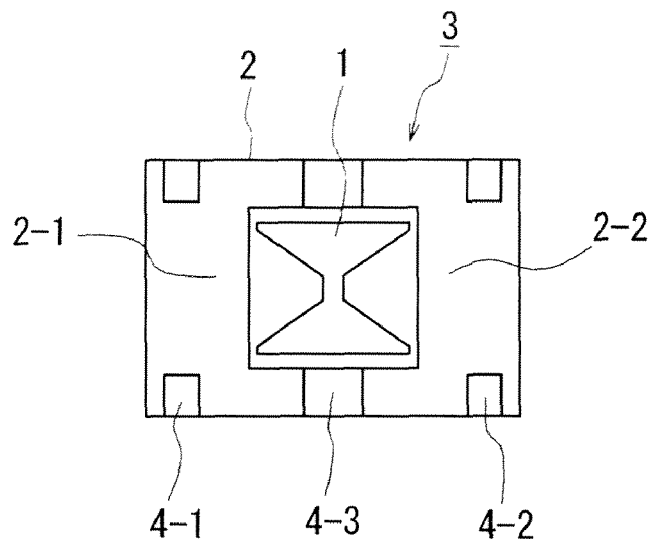
FIG. 1 is a plan view of a preferred example of the ignition element mounting capacitor according to the invention.

1 Ignition element
2 Capacitor body
2-1 First capacitor section
2-2 Second capacitor section
3 Ignition element mounting capacitor
4-1 First external terminal electrode
4-2 Second external terminal electrode
4-3 Third external terminal electrode
4-4 Mounted surface of capacitor
5-1 Capacity forming portion
5-2 Output portion
6 Thin film resistor (SCB)
7 SCB substrate
8 SCB chip
9 Through-electrode
10 Side electrode
11 Side through-hole electrode
12 Metal film
13 Solder bump
14 Solder resist
15 IC
15-1 Electrode pad for connecting to first external terminal electrode
15-2 Electrode pad for connecting to second external terminal electrode
15-3 Electrode pad for connecting to third external terminal electrode
15-4 Electrode pad for connecting to electrode pin
16 Header
17, 17' Electrode pins
18 Sealing glass
19 Header assembly
20 Cylindrical collar
21 Resin
22 Ignition powder 23 Cup body
24 Protective resin cup
31 Gas generator for air bag
32 Squib
33 Enhancer
34 Gas generating agent
35 Filter
36 Outer case
37 Hole
41 Gas generator for seat belt pretensioner (micro gas-generator)
42 Squib
43 Gas generating agent
44 Base (holder)
45 Cup body
110 Central control unit
111a to 111d Air bag modules
114, 115 Electrode pins

BEST MODE FOR CARRYING OUT THE INVENTION

The invention will then be specifically explained.

Figure 2:
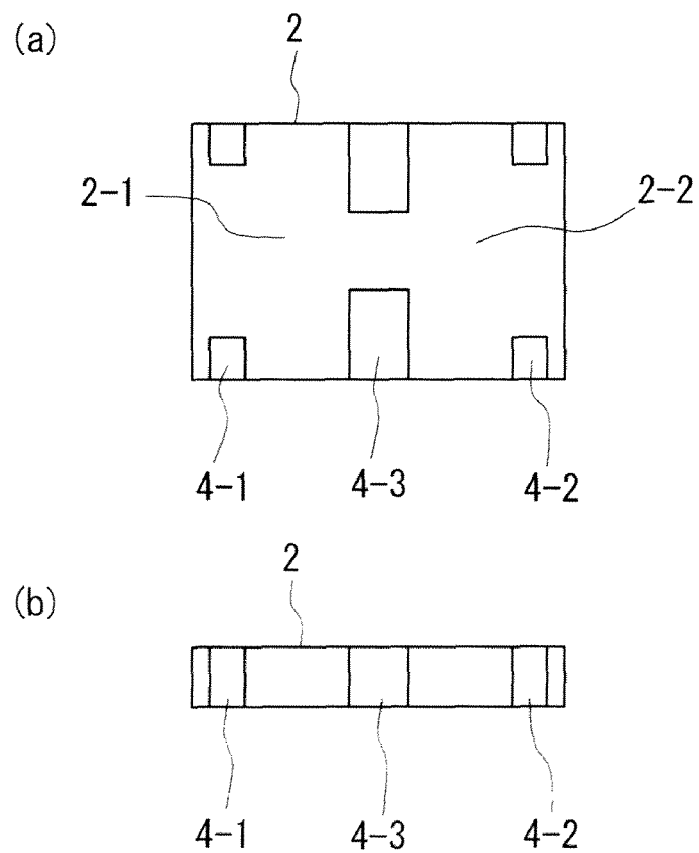
FIG. 2 illustrates the capacitor body in a plan view (a) and a side view (b)

FIG. 1 illustrates a preferable example of the ignition element mounting capacitor according to the invention in a plan view. In addition, FIG. 2 shows the capacitor only in a plan view (a) and a side view (b).

In FIG. 1, reference numeral 1 denotes an ignition element, and reference numeral 2 shows a capacitor body having two kinds of capacitor functions. The ignition element 1 is mounted on the capacitor body 2 to construct the ignition element mounting capacitor 3.

The capacitor body 2 is constructed by laminating a plurality of dielectric layers and has therein a first capacitor section 2-1, and a second capacitor section 2-2. The first capacitor section is used for igniting, while the second capacitor section is for activating an IC or removing noise.

Moreover, the capacitor body 2 is provided on its outer surfaces with first to third external terminal electrodes 4-1, 4-2, and 4-3. The first external terminal electrodes 4-1 and the second external terminal electrodes 4-2 are electrically connected to the first capacitor section 2-1 and the second capacitor section 2-2, respectively. The third external terminal electrodes 4-3 are electrically connected to the ignition element 1.

Figure 3:
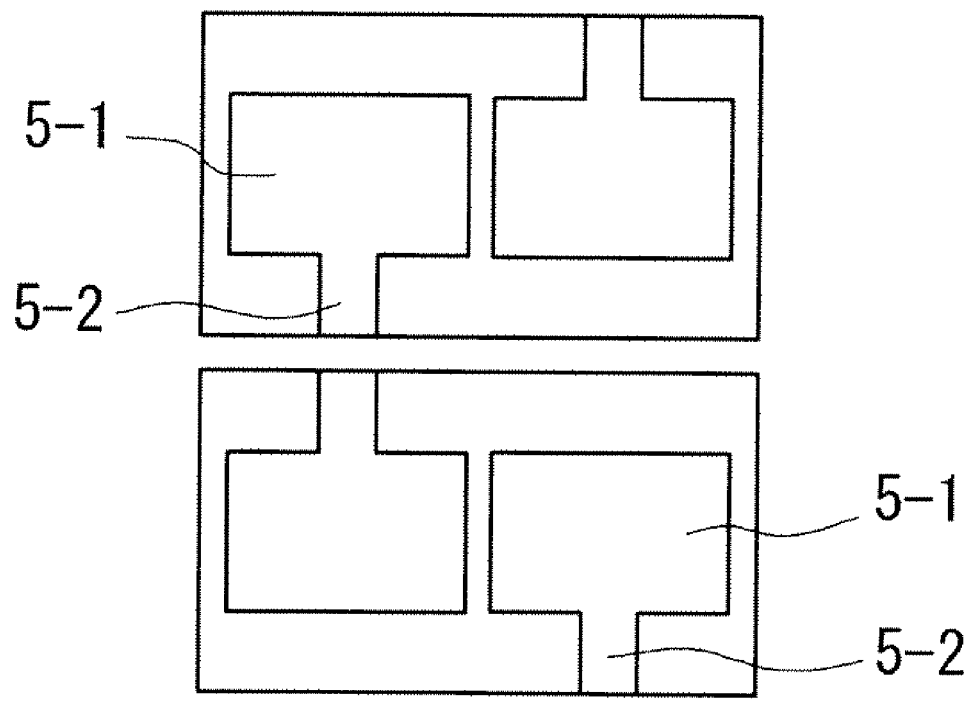
FIG. 3 is a plan view of internal electrode patterns.

FIG. 3 illustrates an example for producing two kinds of capacitors in the capacitor body in plan views (a) and (b).

FIG. 3 shows internal electrode patterns in plan views. Respective plurality of electrode patterns are laminated to produce two kinds of capacitors, that is, the first capacitor section and the second capacitor section.

Figure 4:
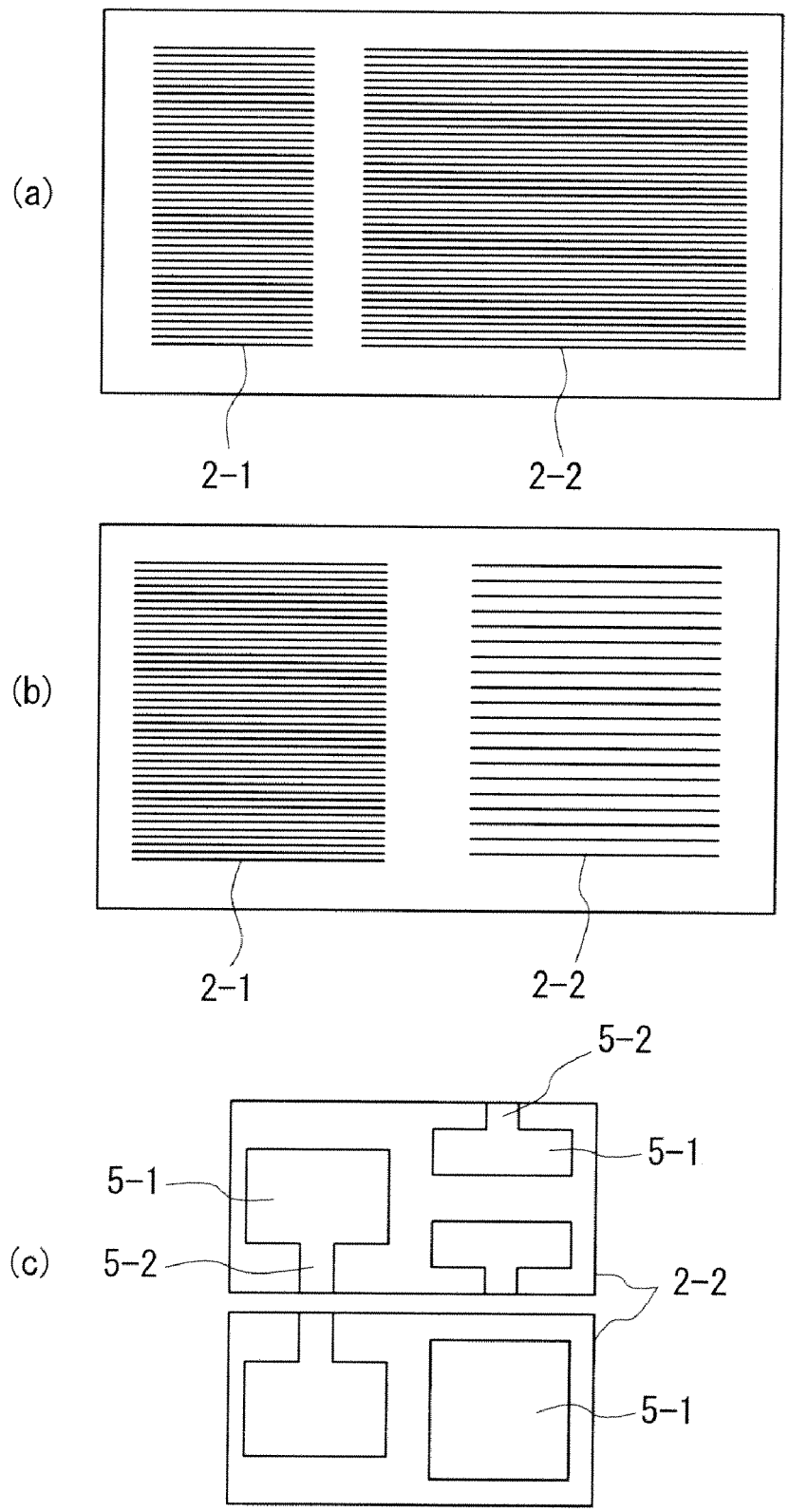
FIG. 4 illustrates sectional views of laminated bodies for changing capacities of capacitors and includes (a) changing areas of internal electrodes, (b) changing laminated numbers, and (c) changing connections of capacitors.

FIG. 4 illustrates sections of laminated bodies for changing capacities of the first and second capacitor sections 2-1 and 2-2 in (a) and (b). The sectional view (a) is of the case that areas of the respective internal electrodes are varied, and (b) is of the case that the numbers of the laminated layers are varied. A plan view (c) shows the case that a plurality of capacities are connected in series to lower the capacity of the second capacitor section 2-2.

As described above, the first capacitor section is formed in a manner that particular dielectric layers are interposed between the first internal electrodes opposite to each other. The second capacitor section is also formed in a manner that particular dielectric layers are interposed between the second internal electrodes opposite to each other.

As shown in FIG. 3, the first and second internal electrodes each have a capacity forming portion 5-1 and an output portion 5-2, respectively. And the first and second internal electrodes are electrically connected through the output portions 5-2 to the first and second external terminal electrodes 4-1 and 4-2 (refer to FIG. 2), respectively. As shown in the drawing, the output portions 5-2 of the first and second internal electrodes are narrower than the capacity forming portions 5-1. However, the output portions need not be narrower, but they may have the same widths as those of the capacity forming portions 5-1.

The capacities of the first and second capacitor sections may be the same or different from each other in the invention.

In many cases, the capacity required for removing noise is smaller in comparison with the capacity required for heating the ignition element or igniting the ignition powder.

Therefore, it is practicable to provide the first capacitor section whose capacity is larger than that of the second capacitor section.

For obtaining the first and second capacitor sections having different capacities, such first and second internal electrodes may be employed whose corresponding areas are different, or whose numbers of laminated layers of the internal electrodes are different.

Different connecting methods for the first and second internal capacitors may be employed. These methods are shown in (a), (b) and (c) of FIG. 4. At this point, it is preferable that the capacity of the first capacitor section is of the order of 0.5 to 10 μF, and the capacity of the second capacitor section is of the order of 0.1 to 10 μF.

Materials for the dielectric layers of the capacitor sections are not particularly limited, but, for example, it is preferable to use a ceramic which contains $BaTiO_3$, $CaTiO_3$, $SrTiO_3$, $CaZrO_3$, or the like as main components. Moreover, a ceramic may also be used which contains accessory components such as manganese compound, iron compound, chromium compound, cobalt compound, nickel compound, and the like in addition to the main components described above.

Preferably, the thickness of dielectric layers after fired is of the order of 1 to 10 μm.

As materials for the internal electrodes, for example, Ni, Cu, Ag, Pd, Ag—Pd alloy, Au, and the like are advantageously applicable.

Preferably, the thickness of such internal electrodes after fired is of the order of 0.5 to 2.0 μm.

Further, as materials for the external electrodes, for example, Cu, Ni, Ag, Pd, Ag—Pd alloy, Au, and the like are preferable.

For forming such external terminal electrodes, they may be fired simultaneously with the firing of the internal electrodes as a co-firing, or after coated with a conductive paste the external terminal may be fired as a post-firing, or the external terminal electrodes may be formed by directly plating.

The ultimate thickness (of the thickest parts) of the external terminal electrodes are preferably of the order of 20 to 100 μm.

In addition, the external terminal electrodes may be formed thereon with a plated film so as to match a mounting configuration. As plated films, for example, Cu. Ni, Sn, Au, or the like may be used. Further, a plated film consisting of a plurality of layers such as Ni—Sn, Ni—Au, Cu—Ni—Au, and the like may be used. Preferably, a thickness of one layer of the plated film is of the order of 1 to 10 μm.

Furthermore, a resin layer may be formed between the external terminal electrodes and the plated film for relaxation of stresses.

A preferable method for producing such ceramic capacitors will then be explained in the order of process steps.
(1) First, what are to be prepared are ceramic green sheets, conductive paste for the internal electrodes, and conductive paste for the external terminal electrodes. Although the ceramic green sheets and the respective conductive pastes contain binders and solvents, in this regard publicly known organic binders and organic solvents may be used. Further, the conductive pastes for the external terminal electrodes frequently contain glass components.

(2) Predetermined patterns are printed on each of the ceramic green sheets using the conductive paste, for example, by means of the screen printing to form internal electrode patterns.

(3) Then, the ceramic green sheets of a predetermined number on which the internal electrode patterns have been printed are laminated, and ceramic green sheets of a predetermined number for outer layers on which internal electrode patterns have not been printed are laminated on both the uppermost and lowermost ceramic green sheets of the already laminated ceramic green sheets to form a mother laminated body. The mother laminated body may be pressed in the laminated directions by means of, for example, hydrostatic fluid pressing, when necessary.

(4) Thereafter, the green or crude mother laminated body thus obtained is cut into predetermined sizes to cut out crude ceramic laminated bodies.

(5) Then, the crude ceramic laminated bodies are fired. Although the firing temperature depends on ceramic material and internal electrode material, it is preferable of the order of 900 to 1,300° C. Further, a firing atmosphere is used by selecting from air, nitrogen, water vapor and nitrogen atmospheres, and the like depending on conditions.

(6) Both end faces of the ceramic laminated bodies are then coated with the conductive paste for the external terminal electrodes and fired to form the external terminal electrodes. The firing temperature in this case is preferably about 700 to 900° C.

(7) Thereafter, outer surfaces of the external terminal electrodes are plated, if needed.

In this way, it is possible to obtain capacitor bodies each having in its interior the first and second capacitor sections and on the outer surfaces the first, second and third external terminal electrodes. While the ceramic capacitors have been described by way of example in the embodiment, it will be apparent that the invention is not to be limited by the example, and other capacitors may be applicable such as film capacitors and the like, using a heat resistant resin as dielectric layers.

And now, the ignition element is mounted on the capacitor body having the first and second capacitor sections according to the invention. The surface of the capacitor on which the ignition element is mounted is any surface so long as it is a surface other than the mounted surface for mounting the capacitor on an IC described later. It is beneficial to mount the ignition element on the surface (upper surface) of the capacitor opposite from the mounted surface of the capacitor.

The third external terminal electrodes are then electrically connected to the ignition element. This connection is not limited to a particular configuration. A case that an SCB chip consisting of an SCB and a substrate is used as the ignition element will be explained, hereinafter.

Figure 5:
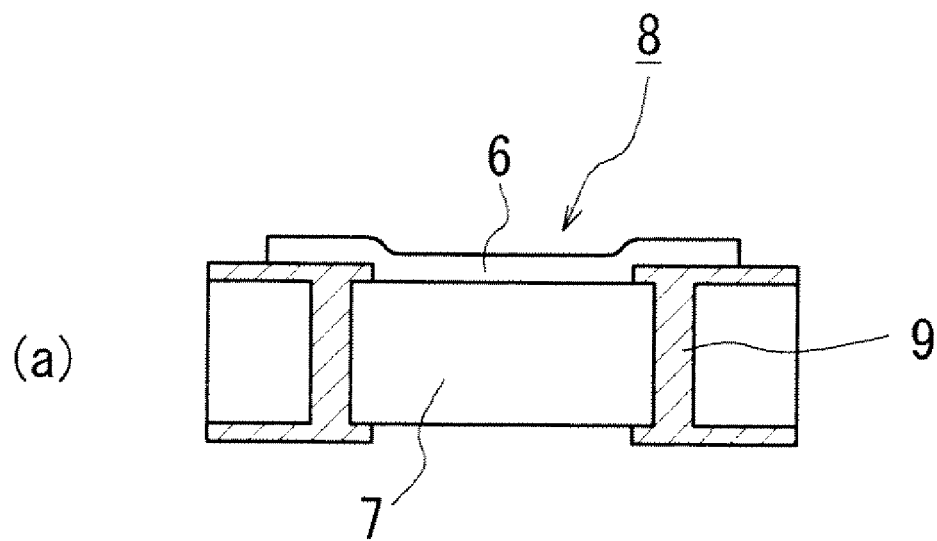
FIG. 5 includes a sectional view (a) and a plan view (b) of an SCB chip having through-electrodes.
Figure 5:
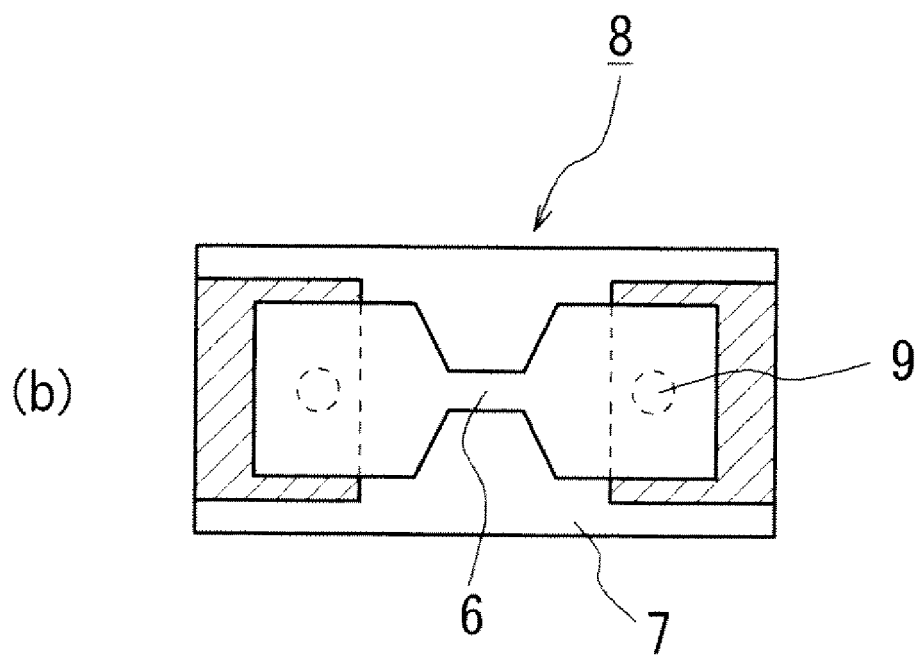

One example of its construction is illustrated in (a) and (b) of FIG. 5, in which reference numeral 6 shows a thin film resister (SCB), and reference numeral 7 denotes its substrate, both members forming an SCB chip 8. Reference numeral 9 shows through-electrodes provided on the SCB chip substrate 7 as relay conductors for connecting the SCB 6 to the third external terminal electrodes.

As shown in the drawing, the SCB chip substrate 7 is provided with the through-electrodes 9 extending from the upper surface to the lower surface of the substrate 7 so that the SCB 6 is electrically connected through the through-electrodes 9 to the third external terminal electrodes. The SCB 6 has a construction formed, for example, by alternately laminating Ti layers and $SiO_2$ layers. As the material of the through-electrodes 9, for example, copper or the like may be used.

Another connection configuration will then be explained.

Figure 6:
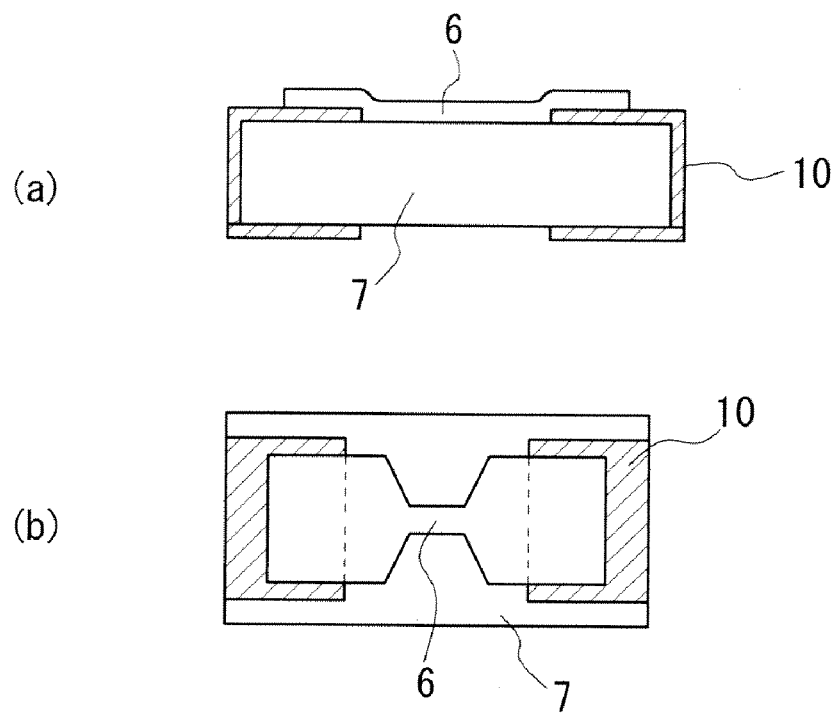
FIG. 6 includes a sectional view (a) and a plan view (b) of an SCB chip having side electrodes.

FIG. 6 illustrates a case of an SCB chip substrate 7 provided with an SCB 6 and side electrodes 10 as relay conductors for connecting the SCB 6 to the third external terminal electrodes.

Figure 7:
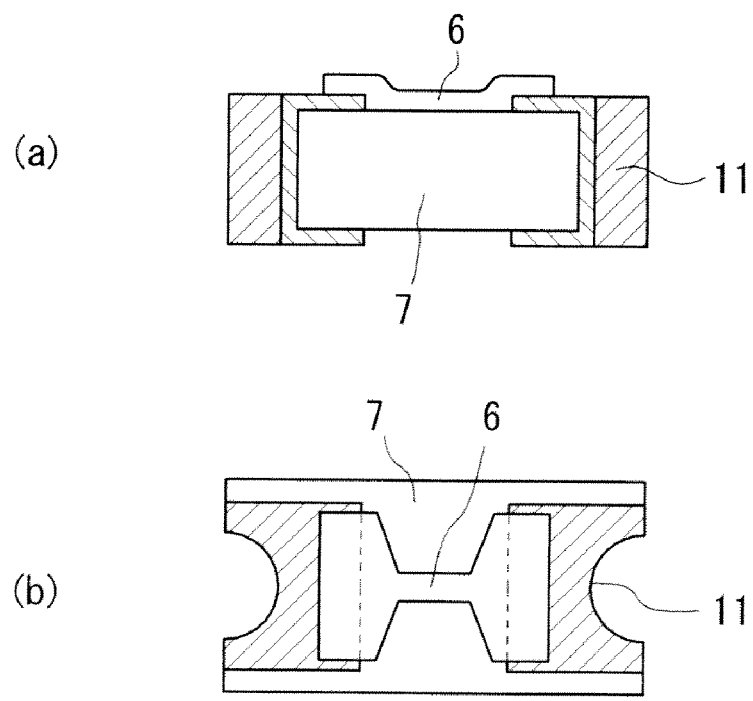
FIG. 7 includes a sectional view (a) and a plan view (b) of an SCB chip having side through-hole electrodes as the side electrodes.

Moreover, FIG. 7 shows a use of side through-hole electrodes 11 as an another example of the side electrodes. Before forming the film of an SCB 6, a substrate 7 is formed with through-hole electrodes, and after the film of the SCB 6 has been formed, the product is cut out through the through-hole electrodes when the product is divided into chips in the final step, whereby the semicircular side through-hole electrodes 11 are formed in a state that they are exposed at side surfaces of the SCB chip substrate 7. In addition, the shape of the side through-hole electrodes 11 is not to be limited to the circular, and the side through-hole electrodes 11 can be of any shape by the use of micro blasting, laser machining, or the like. Further, by using these methods the side electrodes can be formed in a simpler manner.

Figure 8:
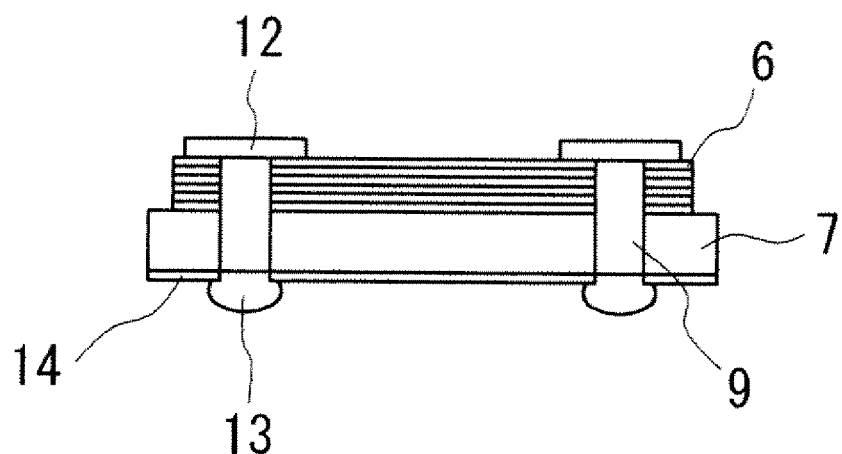
FIG. 8 includes a sectional view (a) and a plan view (b) of an SCB chip having through-electrodes.
Figure 8:
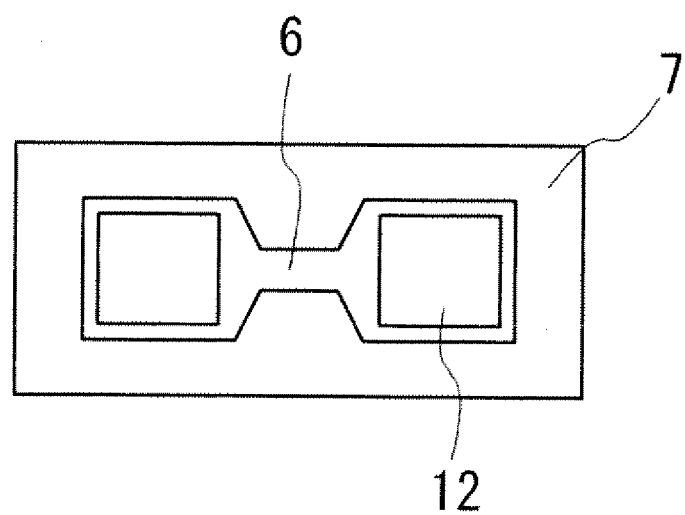

FIG. 8 illustrates a case that through-conductors 9 are formed so as to pass through an SCB chip substrate 7 and an SCB 6. The SCB 6 is formed on its upper surface with metal films 12 adapted to abut against the through-conductors 9. On the other hand, the lower surface of the SCB chip substrate 7 is formed with solder bumps 13 adapted to be electrically connected to the through-conductors 9, respectively. Moreover, the lower surface of the SCB chip substrate 7 is formed with a solder resist 14 for preventing spreading of solder due to wetting.

With this construction, the metal films 12 become bottom surfaces of the through-holes so that the through-conductors 9 can be easily formed by packing the through-holes with conductor. The metal films 12 are of a three layer construction, for example, consisting of a titanium layer, a copper layer, and a further titanium layer, these being formed by thin-film forming means. Here, the titanium layers serve to prevent the copper layer from oxidizing and are thinner than the copper layer. The through-conductors 9 are formed by the electrolytic plating or the like. As the material of the solder bumps 13, Sn—Ag—Cu alloy or the like may be used. Further, the solder resist 14 is formed from, for example, a light-sensitive resin or the like.

The material from which to form the substrate of the SCB chip may be any one so long as it can be used as printed circuit board. Particularly preferable are glass substrate, ceramic substrate, LTCC (Low Temperature Co-fired Multilayer Ceramic Substrates), silicon substrate, and the like. The reason for selecting these materials is that a resistive heating element is supplied with electric energy to generate heat, by means of which the explosive or ignition powder is heated to an ignition temperature of about 300° C. so as to be ignited so that preferably the substrate is stable until at this ignition temperature.

The IC on which the ignition element mounting capacitor is mounted will then be explained.

Figure 9:
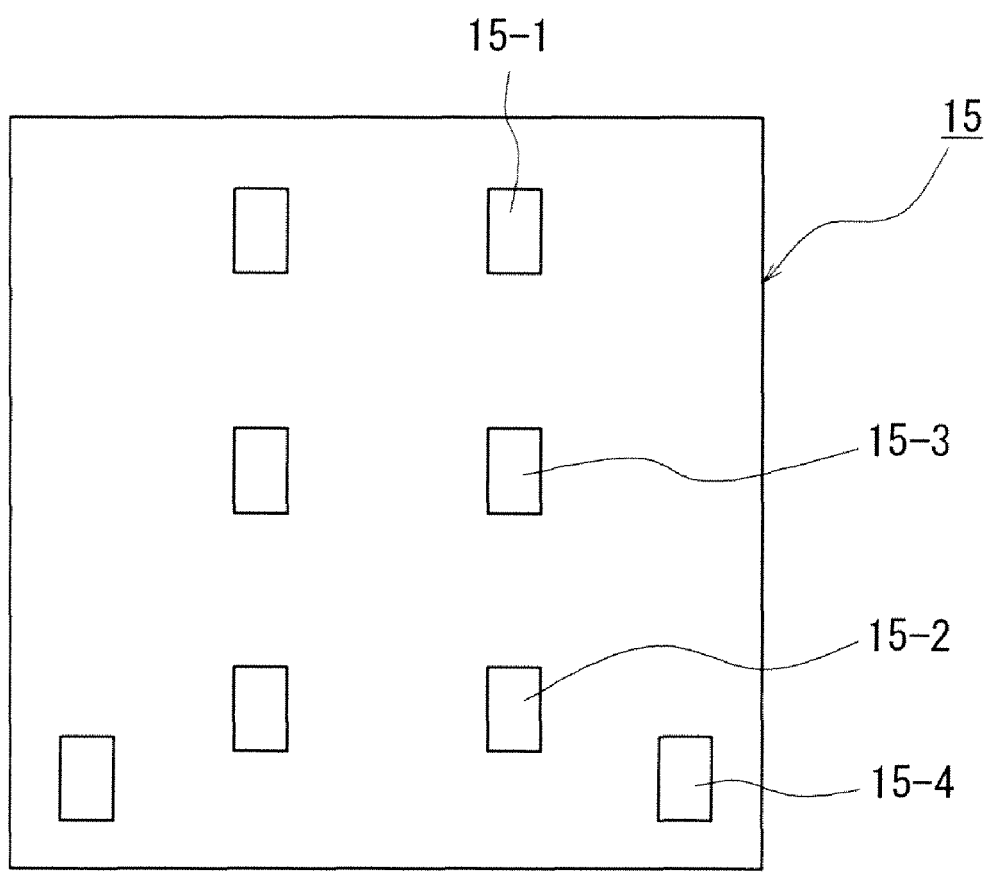
FIG. 9 is a plan view of an IC on which the ignition element mounting capacity is to be mounted.

As shown in FIG. 9, the IC 15 comprises electrode pads for connecting to the first to third external terminal electrodes and electrode pads for connecting to electrode pins for connecting to the external, and the ignition element is actuated through these electrode pads.

In the drawing, the electrode pads 15-1 are electrode pads for connecting to the first external terminal electrodes, the electrode pads 15-2 for connecting to the second external terminal electrodes, the electrode pads 15-3 for connecting to the third external terminal electrodes, and the electrode pads 15-4 for connecting to the electrode pins. As the material for such a substrate for the IC, silicon or the like is advantageously applicable.

Signals for communication from the external are transmitted to the IC through the electrode pads 15-4 of the IC 15 connected to the electrode pins. The IC 15 reads out required information from the signals and at the same time stores energy in the first capacitor for igniting the ignition element through the first external terminal electrodes connected to the electrode pads 15-1. And, the electrode pads 15-2 are connected through the second external terminal electrodes to the second capacitor having a function for removing noise which affects the external circuits. Further, the electrode pads 15-3 are connected to the SCB through the third external terminal electrodes.

The IC 15 can exchange information to and from the central control unit of an air back system through communication therebetween. When the central control unit detects a collision of a car, a command of ignition is transmitted to a desired IC through a signal by means of which a desired squib is ignited. The IC of the squib requested to ignite can flow the energy stored in the first capacitor to the SCB by means of a switching circuit in the IC. On supplying the SCB with the energy from the capacitor, the SCB is heated to ignite ignition powder.

A header assembly in which the IC and the ignition element mounting capacitor as described above are built will then be explained.

Figure 10:
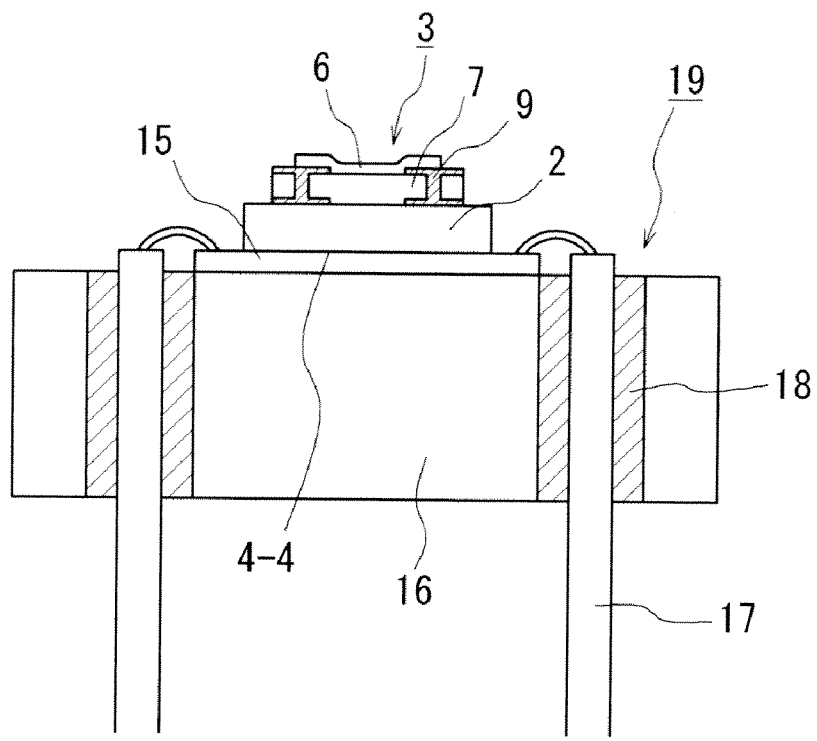
FIG. 10 is a sectional view of a preferred example of the header assembly according to the invention.

FIG. 10 illustrates a favorable header assembly according to the invention by way of example.

The drawing shows a header 16, electrode pins 17, and sealing glass 18 for insulating such electrode pins 17 from each other.

Then, an IC 15 is mounted on the header 16 on which the ignition element mounting capacitor 3 is further mounted to construct the header assembly 19. Moreover, reference numeral 4-4 in the drawing illustrates the mounted surface of the capacitor 2, the mounted surface being in contact with the IC.

In this place, solder or conductive paste is advantageously applicable to connecting means between the first to third external terminal electrodes 4-1, 4-2, and 4-3 provided on the outer surfaces of the capacitor body 2 of the ignition element mounting capacitor and the electrode pads 15-1, 15-2, and 15-3 provided on the IC 15. Moreover, it is also advantageous to use the solder and conductive paste for connecting the electrode pads 15-4 provided on the IC 15 and the electrode pins 17. In this case, it is needed to cover the solder or conductive paste with an insulator. In the case that the upper surface of the header is covered with a resin later described, it is possible to use wire bonding for connecting the electrode pads 15-4 and the electrode pins 17.

Figure 11:
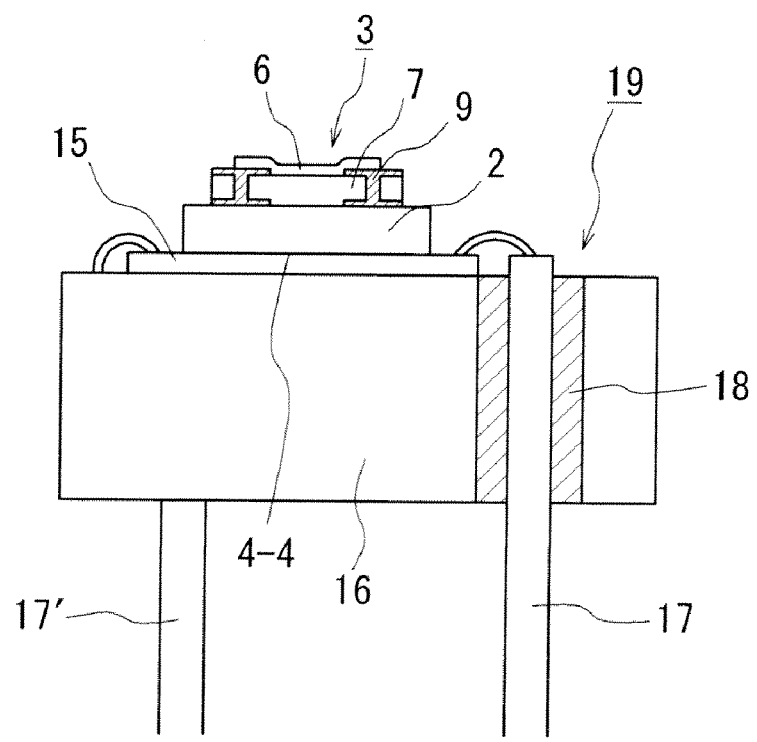
FIG. 11 is a sectional view of an example of the case that the SCB chip and the capacitor according to the invention is mounted on a header whose one electrode pin is grounded.

Further, FIG. 11 illustrates another header assembly according to the invention.

This example is a case that one electrode pin 17' is directly attached to a metal part of a header 16.

By employing such a construction connecting the metal part of the header and the one electrode pin, any erroneous ignition can be securely prevented even when static electricity is applied to the electrode pins and metal parts of the header.

By the way, as can be seen from FIGS. 10 and 11, when the ignition element mounting capacitor 3 is mounted on the header 16, the mounted area protrudes from the header 16 by the thicknesses of the IC and the ignition element mounting capacitor 3. In the event that the upper surface of the header 16 is uneven in this manner, when such a header 16 is inserted into a cup body to be in contact with the ignition powder under pressure, although the ignition powder above the ignition element 6 is densely compressed, the ignition powder around the ignition element 6 becomes of lower density which would cause severe irregularities in ignition sensitivity and time to ignition upon operating the squib so that there would be the risk of an impediment to the stable operation of a squib.

In order to overcome such adverse effects, it is preferable to cover the header with a resin whose outer diameter is substantially equal to the outer circumferential diameter of the header and whose head reaches at least the level of the height of the ignition element.

Figure 12:
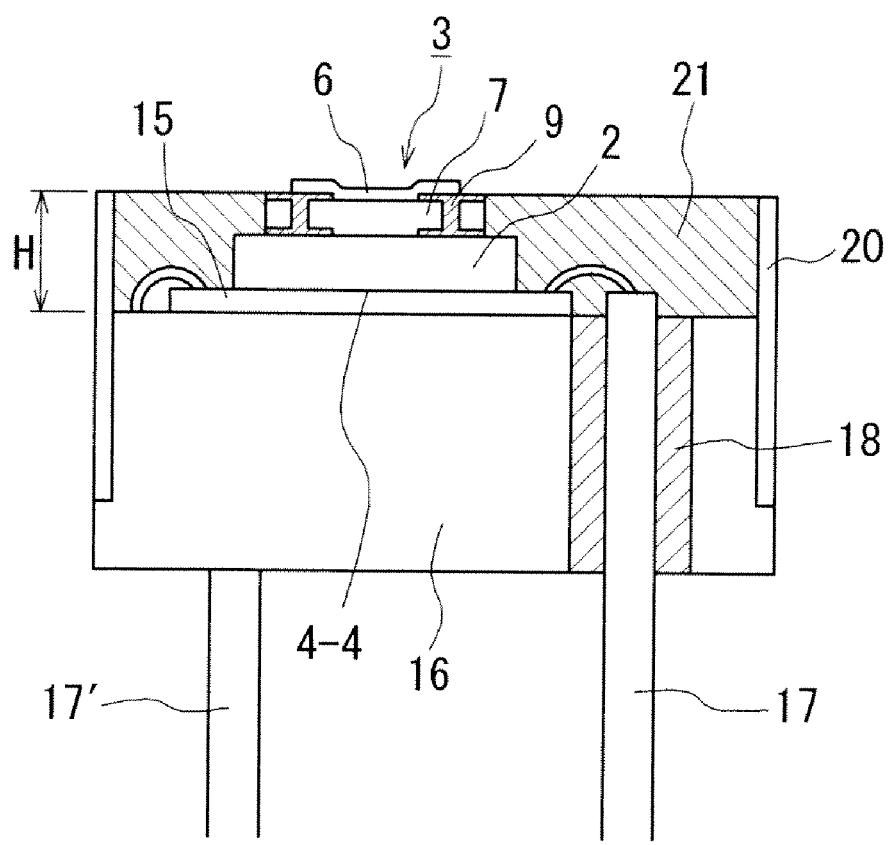
FIG. 12 is a view illustrating the state that the header is provided on its outer circumference with a cylindrical collar into which a resin is packed.

For forming such a resin covering, as shown, for example, in FIG. 12, a cylindrical collar 20 is provided on the outer circumference of the header 16 such that the head of the collar 20 is at least substantially at the level of the height of the ignition element 6, and the cylindrical collar 20 is filled or packed with a resin 21.

By packing the collar 20 with the resin 21, the inner area of the cylindrical collar 20 becomes flat, with the result that the pressed density of the ignition powder in the cup body can be uniformed.

In doing so, if the filled resin 21 covers the element surface of the ignition element 6, the ignition powder could not be ignited, and therefore in packing with the resin 21, it is important to pack the collar 20 with the resin 21 except for the element surface of the ignition element 6.

In packing the collar with the resin 21, it is most suitable to make the heights of the ignition element 6 and the resin 21 substantially the same as described above. However, if it is tried to make equal the levels of heights of the ignition element 6 and the resin 21 filled around it, there is a risk of the filled resin 21 covering even the element surface of the ignition element 6.

Therefore, the inventors of the present case have investigated the relation between the operation stability of the squib and difference H between levels of heights of the element surface of the ignition element 6 and the upper surface of the resin 21. As a result, they have ascertained that if the difference H between the levels of the heights is preferably within 0.5 mm, more preferably within 0.3 mm, there is little or no change in the operation stability of the squib.

Figure 13:
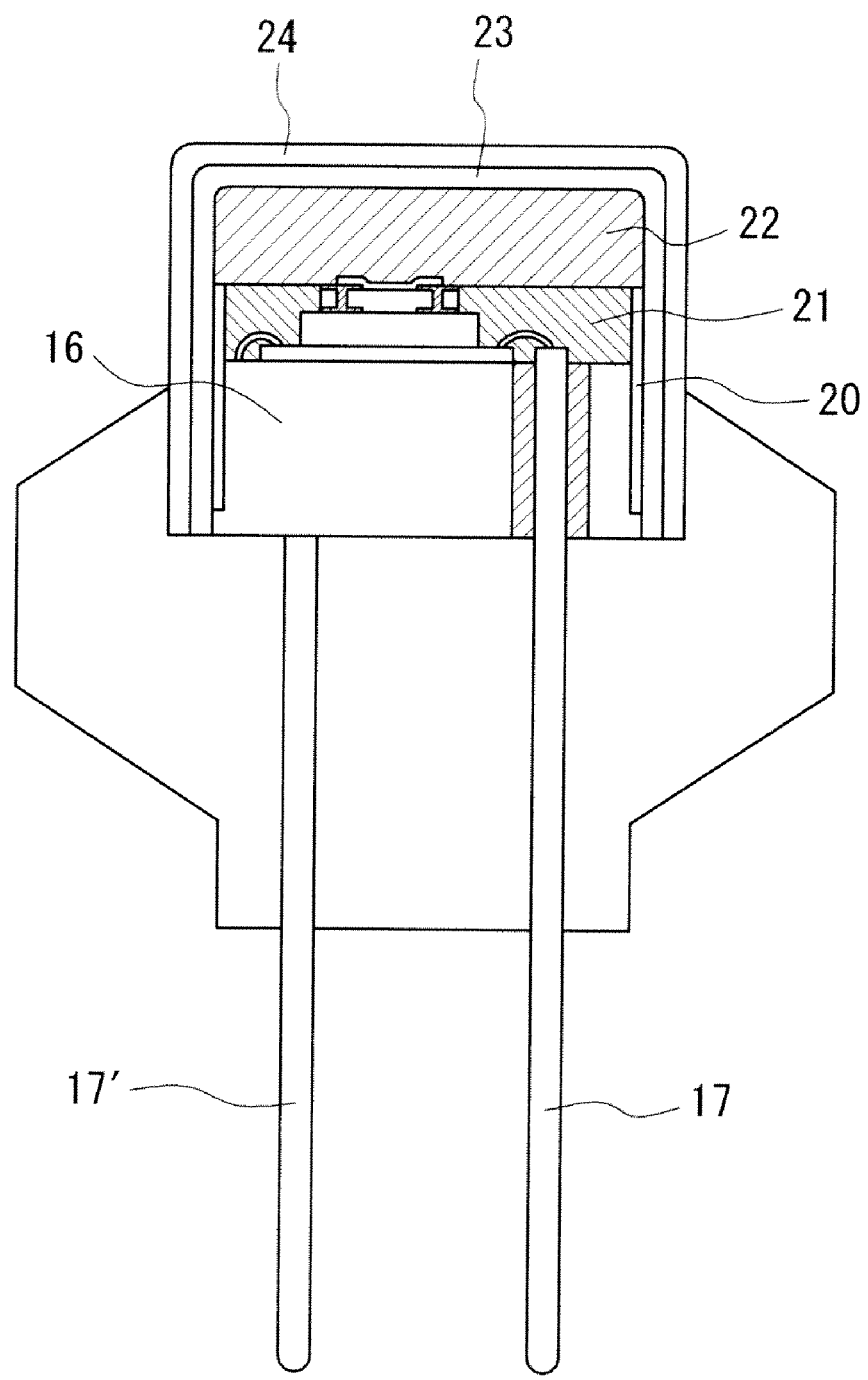
FIG. 13 is an overall view of a squib according to the invention.

Then, a squib as a whole is shown in section in FIG. 13, which is completed by press-fitting and fixing the header assembly as described above in the opening of a cup body having ignition powder therein.

FIG. 13 illustrates ignition powder 22, a cup body 23, and a protective resin cup 24. As shown in the drawing, as the resin 21 is filled in the cylindrical collar 20, the upper surface of the header 16 is flat so that when such a header assembly is press-fitted in the cup body, there is no difference in density of the ignition powder, with the result that irregularities of ignition sensitivity and time to ignition do not occur when the squib is actuated.

As the ignition powder for use in the present invention, it is preferable to contain zirconium in its composition. Other than this, those containing titanium hydride, boron or lead trinitroresorcinate are advantageously applicable to the ignition powder. Moreover, as the ignition powder other than those described above, there are those disclosed in the specification of Japanese Patent Application Laid Open No. 2002-362,992. Ignition powders are not particularly limited for this purpose, and the thin film resistor as a resistive heating element is arranged in contact with such an ignition powder.

In the present invention, further, the upper surface of the ignition element may be previously coated with an ignition powder composition. In more detail, ignition powder in the form of slurry is dispensed onto the upper surface of a thin film resistor and is dried. In comparison with the case of ignition powder simply packed, the coated and dried ignition powder composition contacts the thin film resistor in a stable condition which effectively contributes to a reliable ignition and shortening of ignition time.

A gas generator for an air bag using the ignition device according to the invention will then be explained.

Figure 14:
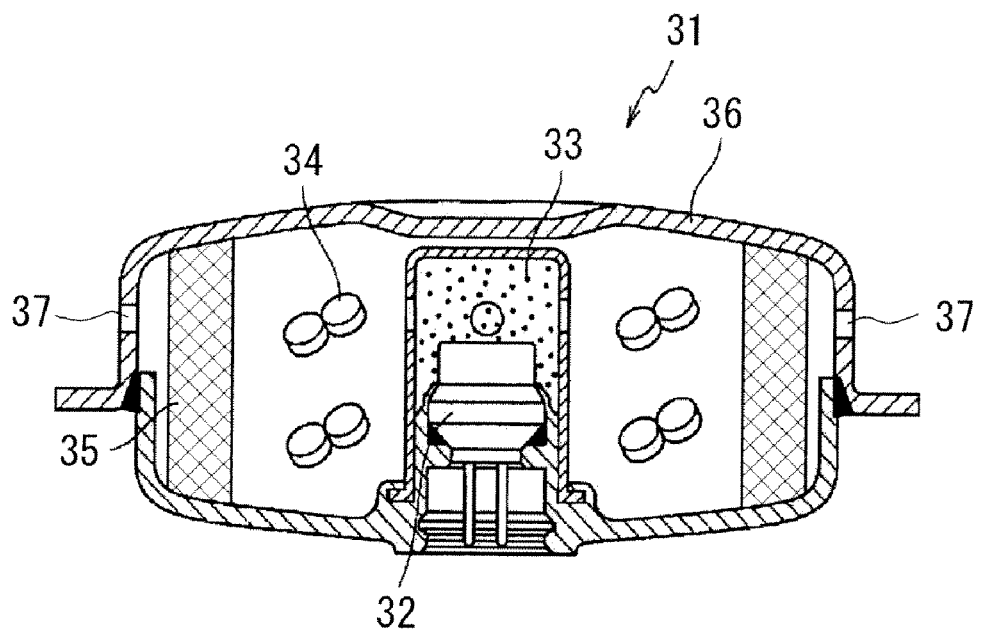
FIG. 14 is a conceptual view of a gas generator for an air bag.

FIG. 14 is a conceptual view of a gas generator for an air bag. As shown in the drawing, the gas generator 31 for the air bag comprises therein a squib 32, an enhancer 33, gas generating agent 34, and filters 35, and further an outer case 36 defining the outside of the generator and withstanding the pressure when the gas generating agent 34 is burned. The outer case 36 is formed with holes 37 for discharging the generated gas into the air bag.

When the squib 32 is actuated, the enhancer 33 burns by heat energy produced from the squib 32 to generate flame and thermal particles by means of which the gas generating agent 34 is burned to generate a gas for inflating the air bag. The generated gas is discharged out of the outer case 36 through the holes 37 formed in the outer case 36. At this time, the gas passes through the filters 35 so that residues of the burned gas generating agent are collected at the filters, and the gas itself is cooled simultaneously.

Figure 15:
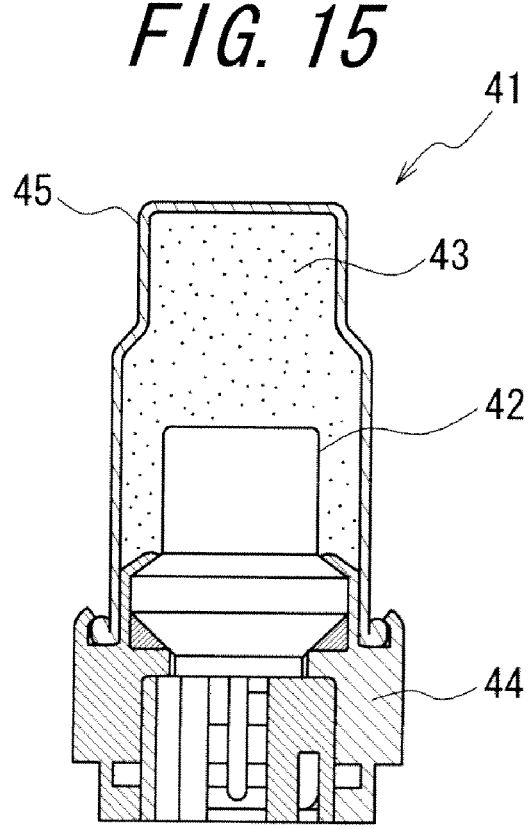
FIG. 15 is a conceptual view of a gas generator for a seat belt pretensioner.

Moreover, a gas generator (micro gas-generator) for a seat belt pretensioner using the ignition device according to the invention will be explained. FIG. 15 is a conceptual view illustrating the gas generator (micro gas-generator) for a seat belt pretensioner. As shown in the drawing, the micro gas-generator 41 comprises therein a squib 42 and a gas generating agent 43. The squib 42 is fixed to a base 44 called a holder. Further, a cup body 45 for storing a gas generating agent 43 therein is also fixed to the holder by means of, for example, crimping. When the squib 42 is actuated, the gas generating agent 43 in the cup body 45 is burned by the flame and the thermal particles coming from the squib 42 to generate a gas.

The control procedure by the central control unit for operating the squib according to the invention will then be explained.

Figure 16:
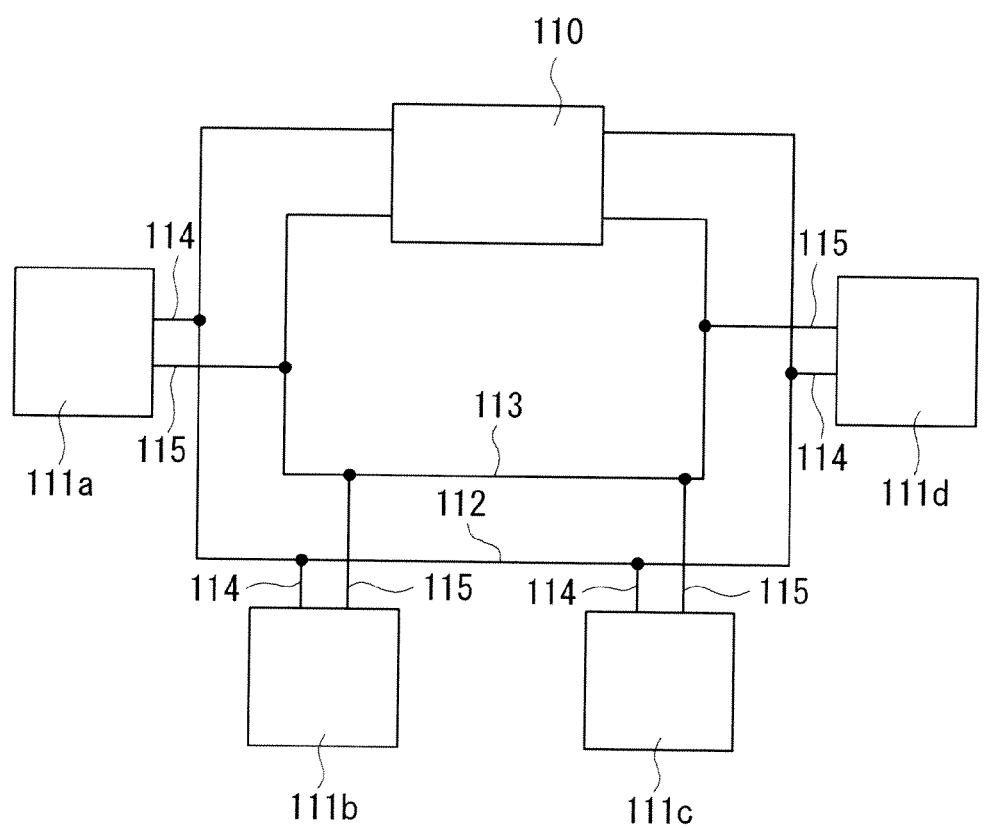
FIG. 16 is an explanatory view of a central control unit.

FIG. 16 illustrates an example of the air bag system linked to a local area network (LAN) and connected to the central control unit 110 and four air bag modules 111a, 111b, 111c and 111d. The two air bag modules 111b and 111c each may have a gas generator for inflating, for example, a front air bag, while the other two air bag modules 111a and 111d each may have a gas generator for inflating, for example, a side air bag.

The ignition device is put in the gas generator included in each of these modules. Each of the ignition devices has two electrode pins 114 and 115, the former electrode pin 114 being connected to a first electric-supply conductor 112 connected to the central control unit 110, and the latter electrode pin 115 being connected to a second electric-supply conductor 113 connected to the central control unit 110.

Under a normal condition, that is, when a car does not encounter a particular accident requiring activation of one or more air bag modules 111a, 111b, 111c and 111d, the central control unit 110 periodically gives the electric-supply conductors 112 and 113 low electric current which is fed through the electrode pins 114 and 115 to the electric energy storing means (capacitors) of the ignition devices included in the four air bag modules 111a, 111b, 111c and 111d, respectively.

In the event that upon impact, the activation of, for example, the air bag module 111c is desired, the central control unit 110 feeds a particular electric pulse string constituting an ignition command for the ignition device of the air bag module 111c to the first electric-supply conductor 112. Although the particular electric pulse string is fed to each of the ignition devices through the electrode pins 114 and 115, only the IC included in the ignition device of the air bag module 111c responds to the command to supply the electric energy from the first capacitor to the ignition element, thereby igniting the ignition powder in the manner described above.

Following the impact, if it is desired to activate some air bag modules, for example, the air bag modules 111a and 111b, the central control unit 110 gives the first electric-supply conductor 112 a particular electric pulse string for each of the ignition devices included in the air bag modules 111a and 111b, respectively. The two ignition devices operate in the same manner as described above.

What is claimed is:

1. An ignition element mounting capacitor comprising:
    (a) an ignition element mounted directly on said capacitor, said ignition element being a semiconductor bridge (SCB) chip, said SCB chip comprising an SCB and its substrate mounted directly on the capacitor;
    (b) a first capacitor section for storing energy for igniting ignition powder;
    (c) a second capacitor section for removing noise external to the ignition element;
    (d) first external terminal electrodes electrically connected to said first capacitor section;
    (e) second external terminal electrodes electrically connected to said second capacitor section; and,
    (f) third external terminal electrodes on a capacitor surface electrically connected to said ignition element.

2. The ignition element mounting capacitor as claimed in claim 1, characterized in that said third external terminal electrodes are formed to be connected to a mounted surface of said capacitor.

3. The ignition element mounting capacitor as claimed in claim 2, characterized in that said ignition element is mounted on the surface of said capacitor opposite from said mounted surface.

4. The ignition element mounting capacitor claimed in claim 2, characterized in that said first and second capacitor sections are ceramic capacitors, respectively.

5. A header assembly comprising:
    (a) a cup body containing ignition powder;
    (b) a header for closing the opening of said cup body and having a plurality of electrode pins insulated from one another;
    (c) the ignition element mounting capacitor claimed in claim 2; and
    (d) an integrated circuit (IC) located on said header, comprising:
        (i) first, second, and third electrodes for the capacitor to be electrically connected to said first, second, and third external terminal electrodes of said ignition element mounting capacitor of claim 2; and
        (ii) connection electrodes to be electrically connected to the electrode pins of said header for communication with external circuits; and
    (e) said ignition element mounting capacitor being located on said IC and electrically connected to said electrode pins through said connection electrodes provided on said IC.

6. The ignition element mounting capacitor claimed in claim 1, characterized in that said first and second capacitor sections are ceramic capacitors, respectively.

7. The ignition element mounting capacitor claimed in claim 1, characterized in that said third external terminal electrodes are electrically connected to the SCB through relay conductors provided on the substrate of said SCB chip.

8. A header assembly comprising:
  (a) a cup body, having an opening, containing ignition powder;
  (b) a header closing the opening of said cup body and ignition powder therein and having a plurality of electrode pins insulated from one another;
  (c) the ignition element mounting capacitor claimed in claim 1; and
  (d) an integrated circuit (IC) comprising:
    (i) first, second, and third electrodes to be electrically connected to said first, second, and third external terminal electrodes of said ignition element mounting capacitor of claim 1; and
    (ii) connection electrodes to be electrically connected to the electrode pins of said header for communication with external circuits;
  said IC being located on said header, and said ignition element mounting capacitor being located on said IC and electrically connected to said electrode pins through said connection electrodes provided on said IC.

9. The header assembly claimed in claim 8, characterized in that said header is covered with a resin over all but the element surface of said ignition element, said resin having an outer diameter substantially equal to the outer circumferential diameter of said header and the head of said resin reaching at least a level of the height of said ignition element, thereby making flat the contact surface with the ignition powder.

10. A squib characterized in that the header assembly claimed in claim 9 is press-fitted in and fixed to the opening of a cup body having ignition powder therein.

11. The header assembly claimed in claim 8, characterized in that arranged on said header is a cylindrical collar having an outer diameter substantially equal to the outer circumferential diameter of said header and the cylindrical head reaching at least a level of the height of said ignition element, and a resin is filled in a region inside said collar except for the element surface of said ignition element, thereby making flat the contact surface with the ignition powder.

12. A squib characterized in that the header assembly claimed in claim 8 is press-fitted in and fixed to the opening of a cup body having ignition powder therein.

13. A gas generator for an air bag, having the squib claimed in claim 12.

14. A gas generator for a seat belt pretensioner, having the squib claimed in claim 12.

* * * * *